United States Patent
Chen et al.

(10) Patent No.: US 11,246,311 B2
(45) Date of Patent: Feb. 15, 2022

(54) REGULATOR FOR INCREASING PLANT BETA-GLUCAN CONTENT

(71) Applicant: SICHUAN HUI TAI AGRICULTURAL TECHNOLOGY CO. LTD., Chengdu (CN)

(72) Inventors: Lezhang Chen, Chengdu (CN); Junbo Yang, Chengdu (CN)

(73) Assignee: SICHUAN HUI TAI AGRICULTURAL TECHNOLOGY CO. LTD., Chengdu (CN)

(*) Notice: Subject to any disclaimer, the term of this patent is extended or adjusted under 35 U.S.C. 154(b) by 143 days.

(21) Appl. No.: 16/734,521

(22) Filed: Jan. 6, 2020

(65) Prior Publication Data

US 2020/0221708 A1   Jul. 16, 2020

(30) Foreign Application Priority Data

Jan. 14, 2019 (CN) .......................... 201910030777.5

(51) Int. Cl.
*A01N 63/10* (2020.01)
*A01N 65/00* (2009.01)
*A01N 59/06* (2006.01)

(52) U.S. Cl.
CPC .............. *A01N 65/00* (2013.01); *A01N 59/06* (2013.01); *A01N 63/10* (2020.01)

(58) Field of Classification Search
CPC ........ A01N 63/00; A01N 63/10; A01N 65/00; A01N 25/12; C05D 9/00; C05D 9/02; C05G 3/00; C05G 3/80
See application file for complete search history.

(56) References Cited

FOREIGN PATENT DOCUMENTS

| CN | 101796912 A | 8/2010 |
| CN | 107337517 | * 11/2017 |
| KR | 2009050643 | * 5/2009 |

OTHER PUBLICATIONS

Yu et al. (Culturable Heavy Metal-Resistant and Plant Growth Promoting Bacteria in V—Ti Magnetite Mine Tailing Soil from Panzhihua, China: PLoS One 9(9)) (Year: 2012).*
Alves (A Review on Antimicrobial Activity of Mushroom Extracts and Isolated Compounds, Planta Med 2012; 78&16):1707-1718) (Year: 2014).*

* cited by examiner

*Primary Examiner* — Johann R Richter
*Assistant Examiner* — Danielle Sullivan
(74) *Attorney, Agent, or Firm* — SZDC Law P.C.

(57) ABSTRACT

A regulator for increasing plant β-glucan content includes the following components by weight: 30-50 parts of a magnetic material, 20-30 parts of an oyster shell powder, 20-30 parts of an illite powder, and 10-20 parts of a mushroom polysaccharide extract.

2 Claims, No Drawings

REGULATOR FOR INCREASING PLANT BETA-GLUCAN CONTENT

The present invention claims priority to Chinese Patent Application No. CN201910030777.5, filed on Jan. 14, 2019, which is incorporated by reference for all purposes as if fully set forth herein.

FIELD OF THE INVENTION

The invention relates to the technical field of crop production regulators, in particular, a regulator for increasing plant β-glucan content.

BACKGROUND OF THE INVENTION

β-Glucan is a polysaccharide consisting of glucose, widely present in microorganisms and plants. The main chemical structures of β-glucan include β-1,3 glucan and β-1,6 glucan. The former has antitumor properties and can improve immunity. Experiments have shown that β-glucan, especially β-1,3 glucan, can promote the production of IgM antibodies to improve the humoral immunity. In addition, β-glucan can remove free radicals, resist radiation, dissolve cholesterol, prevent hyperlipidemia and resist infections caused by viruses, fungi, bacteria, and the like.

In regular foods, the β-glucan content is lower. For example, in regular rice, the weight content of β-glucan is generally about 0.8-1.0%; the weight content of β-glucan in wheat is generally about 0.5%, the weight content of β-glucan in soybeans is generally about 0.3%; and the weight content of β-glucan in tomatoes is generally about 0.15%.

Chinese Patent Application No. 201010131209.3 discloses a method for increasing the content of β-glucan in crops by using birch mushrooms. This method has the following disadvantages: 1. the cost of raw material birch mushroom is high; 2. multiple complicated seed soaking and fertilization steps and high operation cost; and 3. low increase in β-glucan content, specially for tomato.

There is a need for a new method for increasing the content of β-glucan in crops. The method is cost effective and suitable for large scale production.

SUMMARY OF THE INVENTION

In one embodiment, a regulator for increasing plant β-glucan content, includes the following components by weight: 30-50 parts of a magnetic material, 20-30 parts of an oyster shell powder, 20-30 parts of an illite powder, and 10-20 parts of a mushroom polysaccharide extract.

In another embodiment, the magnetic material is a mixture of a permanent ferrite powder and a magnetite powder.

In another embodiment, the magnetite is Panzhihua vanadium-titanium magnetite.

In another embodiment, the regulator includes the following components by weight: 39 parts of a magnetic material, 28 parts of an oyster shell powder, 21 parts of an illite powder, and 12 parts of a mushroom polysaccharide extract.

In another embodiment, the mushroom polysaccharide extract is a shiitake mushroom polysaccharide extract, a straw mushroom polysaccharide extract, a signorina mushroom polysaccharide extract, a boletus polysaccharide extract, or a mixture thereof.

In another embodiment, the mushroom polysaccharide extract is a mixture of a shiitake mushroom polysaccharide extract and a boletus polysaccharide extract.

In another embodiment, the mushroom polysaccharide extract is prepared by the following steps: freeze drying a raw material, crushing the raw material to 30 mesh at room temperature, adding water in an amount of 5-10 times the weight of the raw material, adding calcium hydroxide in an amount of 0.1% of the water, stirring, conducting an ultrasonication extraction for 2-3 hours, filtering to obtain a filtrate, concentrating the filtrate under reduced pressure, and freeze drying to obtain the mushroom polysaccharide extract.

The goal of the present invention is to provide a new crop synergist that solves the problems of poor resistance, low fertilizer absorption and utilization, and further improves crops quality.

In order to achieve the above objectives, the present application provides a synergist for improving crop stress resistance and fertilizer absorption capacity, comprising the following components by weight: 20-30 parts of an oyster shell powder, 20-30 parts of a water chestnut skin powder, 10-20 parts of a chinaberry bark powder, 10-20 parts of a magnetic material, 10-20 parts of an illite powder, and 5-10 parts of a shiitake mushroom polysaccharide extract.

The magnetic material of the present invention refers to a material capable of responding to a magnetic field in a certain way, especially a ferromagnetic material. Currently, it has been reported that magnetic materials are used to make magnetic fertilizers, etc., and are also used to stimulate the production of nutrition molecules, inducing plants to produce β-glucan. However, the existing magnetic materials generally require rare earth elements and polymers, the cost of raw materials is high, and the production is relatively complicated.

The oyster shell powder of the present invention is the powder of the shell of oyster, a common shellfish. Research shows that the oyster shell powder contains a large amount of calcium carbonate, and also contains essential trace elements for animals, e.g., copper, magnesium, potassium, molybdenum, phosphorus, manganese, iron, zinc. In addition, the pearl powder layer of oyster shells also contains a variety of amino acid components, so oyster shell powders are used in the field of medical care. The oyster shell powder can also be used for soil improvement.

The illite powder of the present invention is a powder of the clay mineral illite. The chemical composition of illite is $K<1$ $(Al, R^{2+})_2$ $[(Si, Al)\ Si_3O_{10}]$ $[OH].nH_2O$. Its crystal is mainly monoclinic aqueous layered structure silicate mineral. Research shows that illite has superior chemical and physical properties, such as high-potassium, high-aluminum, low-iron and smooth, bright, delicate, and heat-resistant. Illite can also release negative ions and far infrared rays. Illite is reported to be used for potassium fertilizer, soil improver and so on.

The mushroom extract of the present invention refers to an extract product obtained by using certain mushrooms as raw materials. The mushrooms are preferably dried by natural air-drying. The mushrooms contain a large amount of active mushroom polysaccharide, and the active ingredient in the mushroom active polysaccharide is mainly β-glucan. The inventors of the present application inventors have conducted a large number of experiments and found that the mushroom extract prepared by a suitable method, in combination with the magnetic material, oyster shell powder and illite powder, provides mushroom polysaccharides as "a primer." The primer is multiplied and amplified in crops through other components, which increases the production and content of multiple active polysaccharides in crops, for example, the content of β-glucan can be increased more than 3 times.

DETAILED DESCRIPTION OF THE ILLUSTRATED EMBODIMENTS

Reference will now be made in detail to embodiments of the present invention.

EXAMPLE 1

A regulator for increasing plant β-glucan content includes the following components by weight: 33 parts of a magnetic material, 26 parts of an oyster shell powder, 25 parts of an illite powder, and 16 parts of a mushroom polysaccharide extract.

Among them, the magnetic material is a mixture of a permanent ferrite powder (purchased from Dongyang Hengdian Excellent Magnet Factory) and Panzhihua vanadium-titanium magnetite powder (from the Panzhihua vanadium-titanium magnetite deposit 15 km northeast of Panzhihua City, crushed to 50 mesh). The mass ratio of the permanent ferrite powder to the Panzhihua vanadium-titanium magnetite powder is 35:65.

The mushroom polysaccharide extract is prepared as follows: taking the freeze-dried raw material (shiitake mushroom and boletus, 1:1 by weight), pulverizing it to 30 mesh at room temperature, adding water in an amount of 10 times the weight of the raw material, and adding calcium hydroxide in an amount of about 0.1% of the water mass, mixing well, conducting an ultrasonication extraction for 3 hours, filtering, distilling under reduced pressure, and freeze-drying to obtain the extract as a powder.

The above materials are weighed and mixed uniformly to obtain "Regulator A."

EXAMPLE 2

A regulator for increasing plant β-glucan content includes the following components by weight: 39 parts of a magnetic material, 28 parts of an oyster shell powder, 21 parts of an illite powder, and 12 parts of a mushroom polysaccharide extract.

Among them, the magnetic material is a mixture of a permanent ferrite powder (purchased from Dongyang Hengdian Excellent Magnet Factory) and Panzhihua vanadium-titanium magnetite powder (from the Panzhihua vanadium-titanium magnetite deposit 15 km northeast of Panzhihua City, crushed to 50 mesh). The mass ratio of the permanent ferrite powder to the Panzhihua vanadium-titanium magnetite powder is 35:65.

The mushroom polysaccharide extract is prepared as follows: taking the freeze-dried raw material (shiitake mushroom and boletus, 1:1 by weight), pulverizing it to 30 mesh at room temperature, adding water in an amount of 10 times the weight of the raw material, and adding calcium hydroxide in an amount of about 0.1% of the water mass, mixing well, conducting an ultrasonication extraction for 3 hours, filtering, distilling under reduced pressure, and freeze-drying to obtain the extract as a powder.

The above materials are weighed and mixed uniformly to obtain "Regulator B."

EXAMPLE 3

A regulator for increasing plant β-glucan content includes the following components by weight: 30 parts of a magnetic material, 30 parts of an oyster shell powder, 30 parts of an illite powder, and 10 parts of a mushroom polysaccharide extract.

Among them, the magnetic material is a mixture of a permanent ferrite powder (purchased from Dongyang Hengdian Excellent Magnet Factory) and Panzhihua vanadium-titanium magnetite powder (from the Panzhihua vanadium-titanium magnetite deposit 15 km northeast of Panzhihua City, crushed to 50 mesh). The mass ratio of the permanent ferrite powder to the Panzhihua vanadium-titanium magnetite powder is 35:65.

The mushroom polysaccharide extract is prepared as follows: taking the freeze-dried raw material (shiitake mushroom and boletus, 1:1 by weight), pulverizing it to 30 mesh at room temperature, adding water in an amount of 10 times the weight of the raw material, and adding calcium hydroxide in an amount of about 0.1% of the water mass, mixing well, conducting an ultrasonication extraction for 3 hours, filtering, distilling under reduced pressure, and freeze-drying to obtain the extract as a powder.

The above materials are weighed and mixed uniformly to obtain "Regulator C."

EXAMPLE 4

This example is a comparative example. Compared with Example 2, this example does not include the oyster shell powder, i.e. the materials include 39 parts of the magnetic material, 21 parts of the illite powder, and 12 parts of the mushroom polysaccharide extract. The rest is the same as in Example 2. "Comparative Example A" is obtained.

EXAMPLE 5

This example is a comparative example. Compared with Example 2, this example does not include the illite powder, that is, materials include 39 parts of the magnetic material, 28 parts of the oyster shell powder, and 12 parts of the mushroom polysaccharide extract. The rest is the same as in Example 2. "Comparative Example B" is obtained.

EXAMPLE 6

This example is a comparative example. Compared with Example 2, this example does not include the magnetic material, i.e. the materials include 28 parts of oyster shell powder, 21 parts of the illite powder, and 12 parts of the mushroom polysaccharide extract. The rest is the same as in Example 2. "Comparative Example C" is obtained.

EXAMPLE 7

This example is a comparative example. Compared with Example 2, this example does not include the mushroom polysaccharide extract, i.e. the materials include 39 parts of the magnetic material, 28 parts of the oyster shell powder, and 21 parts of the illite powder. The rest is the same as in Example 2. "Comparative Example D" is obtained.

EXAMPLE 8

In this example, planting rice was used as an example, and a test was performed in a paddy field in Pengzhou, Sichuan, China. Base fertilizer, tiller fertilizer, and ear fertilizer (including combined fertilizers including nitrogen, phosphorus, potassium etc.) were applied according to conventional methods, respectively. Parallel experiments were carried out on six paddy fields with an area of about 1 mu each. In five of the test fields, 9% of "Regulator B," "Comparative Example A," "Comparative Example B," "Comparative Example C," and "Comparative Example D," were added to the fertilizers applied each time. For the remaining paddy field, no regulator was added, proceed as usual, i.e., "Blank Example."

After harvesting, the rice was dried, and the β-glucan in the rice was measured. The contents of β-1,3 glucan and β-1,6 glucan in the total β-glucan were measured, respectively.

The specific measuring method is:

The sample to be tested was first crushed and passed through a 35-mesh sieve. 2 g of the sample was placed in a 100 mL centrifuge tube, 10 mL of ethanol-water solution (50%, v/v) and 30 mL of sodium phosphate buffer solution (20 mM, pH 6.5) were added to the centrifuge tube. The centrifuge tube was heated in boiling water for 5 minutes, shaken, and then heated again for 3 minutes. Gel pieces were not formed in the centrifuge tube. After the centrifuge tube was cooled to 40° C., 2 mL of lichenase was added. After enzymolysis at 40° C. for 1 hour, 18 mL of water was added to adjust the volume to 60 mL. Then it was centrifuged at 1000 r/min for 10 min, and 1 mL of the supernatant was transferred to a glass test tube. 1 mL of β-glucanase was added and hydrolyze at 40° C. for 15 min. 3 mL of GOPOD reagent was added and reacted at 40° C. for 20 min. The absorbance at 510 nm was measured, and converted to the percentage content. The results are shown in Table 1.

TABLE 1

Contents of Total β-glucan in Rice Obtained by Various Treatment Methods (%)

| Groups | Regulator B | Comparative Ex. A | Comparative Ex. B | Comparative Ex. C | Comparative Ex. D | Blank Example |
|---|---|---|---|---|---|---|
| Content | 5.61 | 4.93 | 5.35 | 2.36 | 1.98 | 0.39 |

In addition, in terms of the amount of pesticide used, the amount used for the Regulator B group was reduced by about 20% compared with the Blank Example.

The β-1,3 glucan content was measured using a β-1,3 glucanase detection kit from Solarbio. The results are shown in Table 2.

TABLE 2

Contents of β-1,3 Glucan in Rice Obtained by Various Treatment Methods (%)

| Groups | Regulator B | Comparative Ex. A | Comparative Ex. B | Comparative Ex. C | Comparative Ex. D | Blank Example |
|---|---|---|---|---|---|---|
| Content | 5.33 | 4.68 | 5.11 | 2.01 | 1.73 | 0.35 |

EXAMPLE 9

In this example, planting tomato was used as an example. Tomato was planted in the way as Example 8 except that the planting type, fertilization period, and the amount of fertilizer used were different. The method for measuring β-glucan is also the same as that in Example 8. The results are shown in Table 3.

TABLE 3

Total β-Glucan Content in Tomatoes Obtained by Various Treatment Methods (%)

| Groups | Regulator B | Comparative Ex. A | Comparative Ex. B | Comparative Ex. C | Comparative Ex. D | Blank Example |
|---|---|---|---|---|---|---|
| Content | 2.69 | 2.31 | 2.39 | 0.96 | 0.93 | 0.31 |

What is claimed is:

1. A regulator for increasing plant β-glucan content, consisting of the following components by weight:
   30-50 parts of a magnetic material,
   20-30 parts of an oyster shell powder,
   20-30 parts of an illite powder, and
   10-20 parts of a mushroom extract,
   wherein the magnetic material is a mixture of a permanent ferrite powder and a magnetite powder, and the magnetite powder is Panzhihua vanadium-titanium magnetite;
   wherein the mushroom extract is a shiitake mushroom extract, a straw mushroom extract, a signorina mushroom extract, a boletus extract, or a mixture thereof; and wherein the mushroom extract is prepared by the following steps:
freeze drying a raw material,
crushing the raw material to 30 mesh at room temperature,
adding water in an amount of 5-10 times the weight of the raw material,
adding calcium hydroxide in an amount of 0.1% of the water,
stirring,
conducting an ultrasonication extraction for 2-3 hours,
filtering to obtain a filtrate,
concentrating the filtrate under reduced pressure, and
freeze drying to obtain the mushroom extract.

2. A regulator for increasing plant β-glucan content, consisting of the following components by weight:
39 parts of a magnetic material,
28 parts of an oyster shell powder,
21 parts of an illite powder, and
12 parts of a mushroom extract.

* * * * *